UNITED STATES PATENT OFFICE.

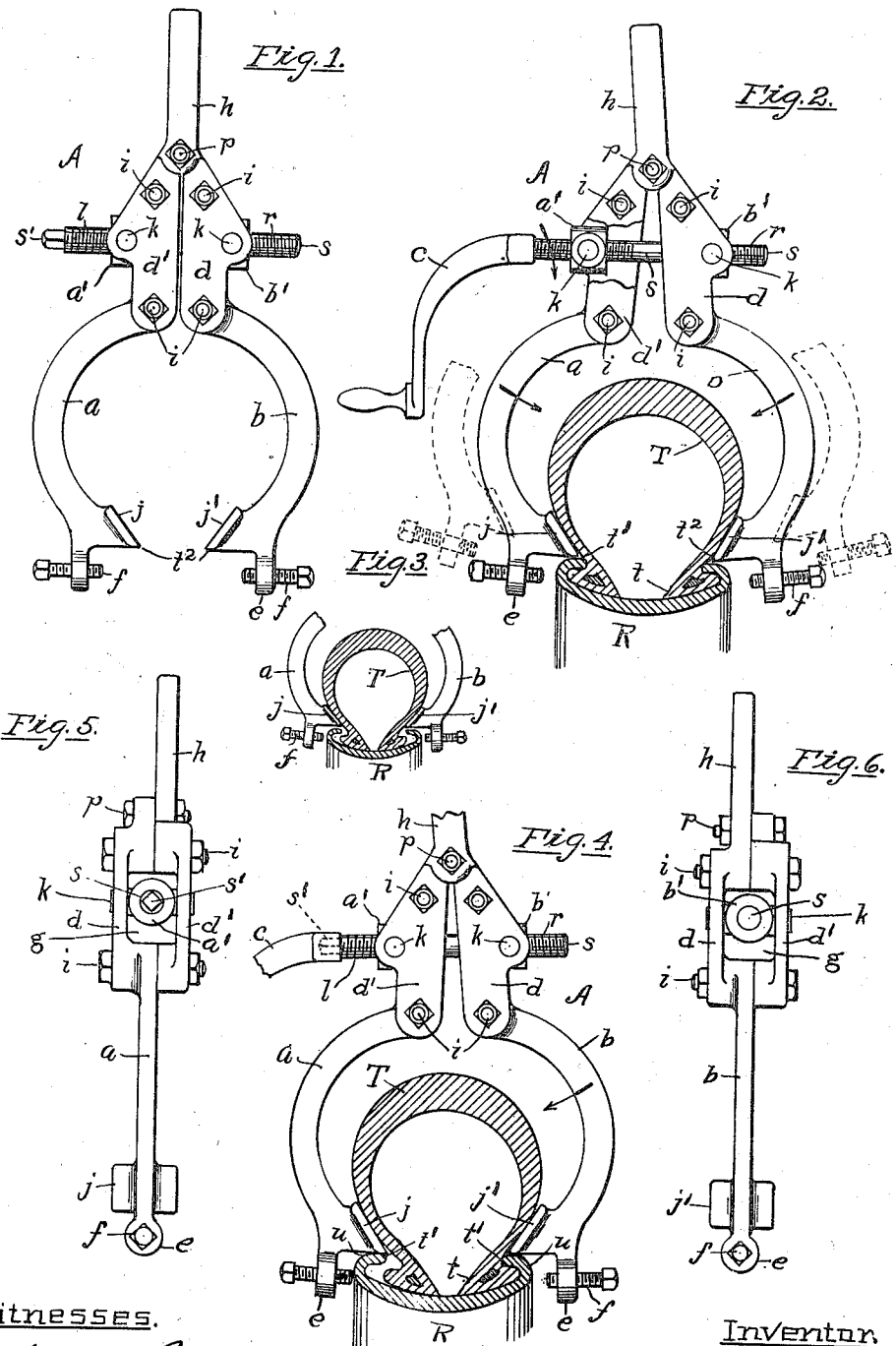

PATRICK T. MAHON, OF CRANSTON, RHODE ISLAND.

TIRE-SHOE-RELEASING TOOL.

1,066,210.  Specification of Letters Patent.  Patented July 1, 1913.

Application filed December 28, 1912. Serial No. 739,050.

*To all whom it may concern:*

Be it known that I, PATRICK T. MAHON, a citizen of the United States, residing at Cranston, in the county of Providence and State of Rhode Island, have invented certain new and useful Improvements in Tire-Shoe-Releasing Tools, of which the following is a specification.

My invention relates to a portable tool especially devised for readily releasing or loosening the resilient casings or tire shoes from the rims of wheels, such for example, as the usual outer casings enveloping the pneumatic tires of automobile wheels, and it consists in the novel construction and arrangement of its parts, all as hereinafter set forth and claimed.

In tools of this general character heretofore devised for releasing the casings from the rims of automobile wheels many are found deficient in structural strength, ease of action, and also lacking in adaptability to loosen both edges of the shoe at one operation. It is well known that rubber tire shoes when normally mounted on the metal rims of wheels frequently become tightly attached to the adjacent metal surface of the rim, or "frozen" to it, as it is sometimes termed, and it becomes a serious and difficult matter to loosen and remove the shoe without injury to it, and more especially so in case it has been in service in running several thousand miles.

My improved tire-releasing tool may be readily applied and adjusted to the shoe and easily operated by one person; its action, when in use, causing both the inner or bottom circular edges to be forcibly loosened from the metal rim simultaneously, at points adjacent the temporarily positioned tool; in other words, the shoe is loosened a considerable distance circumferentially at each setting operation. At the same time adjusting means connected with the tool may be employed to limit the inward movements of the releasing jaws.

In the accompanying sheet of drawings Figure 1 represents a side elevation of my improved tire-shoe releasing tool showing its operating arms normally closed. Fig. 2 is a similar view showing the tool in position to operatively engage the rubber shoe and rim part of a wheel, the said wheel part being in cross section; Fig. 3 represents, in reduced scale, the two lateral or lower end portions of the shoe in the act of being simultaneously loosened from the metal rim by means of the inwardly moving jaws. Fig. 4 is also a side elevation of the complete device showing one side of the shoe loosened from the wheel rim and moved inward to its limit, as determined by the adjustable stop; the other or unloosened side of the shoe still being acted upon. Fig. 5 is an edge elevation viewed from the left of Fig. 4; and Fig. 6 is an edge elevation, viewed from the right of Fig. 4.

The following is a detailed description of the device, including the manner of its operation.

The shoe-releasing tool or device A as a whole comprises essentially a pair of bent pivotally mounted oppositely disposed inwardly facing arms $a$ and $b$ provided at the lower or free ends with integral jaw-like members $j$, $j^1$, respectively. The arms $a$, $b$ are adjustably connected together by a strong horizontally disposed screw $s$ engaging with nuts $a^1$, $b^1$, mounted in and carried by the arms, respectively; the location of the said screw being below the arm's pivot and having its axis at right angles to that of the screw.

The two arms are substantially alike and may be produced from one pattern; the handle extension $h$, however, may be omitted from one of them, as shown. A portion of the arm intermediate the upper curved part and handle is offset transversely and fashioned to a frame-like form, as indicated at $d$. A short fellow frame member $d^1$ is superimposed on each of the former and rigidly secured thereto by bolts $i$, $i$. As thus constructed, a clear opening $g$ is produced in each arm to receive said nuts; these latter are provided with alining short trunnion-like members $k$ mounted to swivel in the adjacent side walls of the frames, as clearly shown. The screw $s$ is provided with longitudinally separated right and left screw-threaded portions $r$ and $l$ in operative engagement with said nuts $b^1$, $a^1$, respectively. The two arms may be joint-connected centrally at the upper end by a single bolt or pivot-pin $p$.

The lower portions of the arms $a$, $b$, are provided with jaw-like members $j$, $j^1$, respectively; each jaw terminating in a substantially wedge-shaped form, as indicated at $t^2$. The inner faces of the jaws extend downward in a convergent manner.

Immediately below the jaws the arms are provided with ears or extensions $e$, each carrying an adjusting screw $f$ constituting a stop, the same, when in use, adapted to limit the inward movement of the jaws.

The manner of using the tool A is as follows:—First assuming that a non-metallic main tire-shoe T of a wheel has become rigidly fixed to the outer periphery of a metal rim R by oxidation or corrosion, or otherwise "frozen" to it; preliminary to using the device, however, the operator separates the arms by means of a removable crank $c$ adapted to receive the end $s^1$ of the screw and rotates the latter sufficiently to permit the open jaws to freely pass over the shoe T, and then by a reverse movement of the screw simultaneously closes the jaws snugly against the lower sides of the shoe where the latter, at $t^1$, hooks under the inturned lateral edges $u$ of a wheel-rim R, as indicated in Fig. 2. (The inner inflatable tire is omitted from the drawing). A forcible rotation of the screw causes the jaws to move inward and loosen the adjacent portions of the shoe from the rim. Fig. 3 indicates the corresponding condition. The jaws are next sufficiently separated and the tool freely moved circumferentially around the shoe to another point and caused to loosen the shoe from the rim, as before described, the operation being repeated at intervals around the wheel as determined by the degree of attachment of the shoe to the wheel-rim.

It sometimes happens that in forcing the jaws inward to loosen the corresponding ends or sides of the shoe one side or a portion of it may be less firmly attached to the rim than another portion; in such event, the less adhesive or more easily acted upon portion will be forced inward until its jaw is arrested by the engagement of its stop $f$ with the metal rim; meanwhile the other or opposed jaw may remain practically stationary, substantially as represented in Fig. 4; the application of added force to the screw, however, causes the last-named jaw to press the corresponding side of the shoe inward from its seat, the first-named movable jaw at the same time remaining stationary, limited by its stop $f$. The said stops may be adjusted so that they will engage the rim R before the extreme ends $t$ of the annular shoe engage each other, thereby preventing injury or excessive contractive movement of said portions of the shoe.

I do not desire to limit my device to the specific form and arrangement of the parts as herein represented, as minor changes may be made therein without departing from the spirit and scope of the invention.

I claim as my invention:

The tool or implement herein described for loosening resilient casings or tire-shoes mounted on the rims of automobile wheels, the same consisting of a pair of oppositely disposed arm members pivoted together at their upper ends, the lower portion of said arms having their inner edges facing each other and adapted, when in normal use, to engage the respective outer lateral sides of a tire-shoe mounted on the rim of the wheel, manually controlled means located in the upper portion of the arms and connecting them, whereby the latter may be positively swung toward or from each other simultaneously at will, and stop means carried by the respective arms, said stops being positioned in a plane lower than that of the faces of the arms which engage the tire-shoe and adapted to limit the inward movement of the arms respectively by engagement of the stops with the rim of the wheel.

In testimony whereof I have affixed my signature in presence of two witnesses.

PATRICK T. MAHON.

Witnesses:
GEO. H. REMINGTON,
F. A. GLOVER.

---

Copies of this patent may be obtained for five cents each, by addressing the "Commissioner of Patents, Washington, D. C."